United States Patent
Van Rooij

(10) Patent No.: US 6,181,038 B1
(45) Date of Patent: *Jan. 30, 2001

(54) ELECTRIC MOTOR OR GENERATOR

(75) Inventor: Harold Van Rooij, Roodt (LU)

(73) Assignee: General Motors Corporation, Detroit, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/857,195

(22) Filed: May 15, 1997

(30) Foreign Application Priority Data

Apr. 22, 1997 (EP) .................................................. 97201179

(51) Int. Cl.⁷ ............................ H02K 5/00; H02K 15/00; H02K 1/32; H02K 1/12
(52) U.S. Cl. ............................... 310/89; 310/42; 310/64; 310/254
(58) Field of Search ..................... 310/89, 45, 192, 310/217, 42, 51, 64, 58, 254

(56) References Cited

U.S. PATENT DOCUMENTS 3,196,301  7/1965  Turk .......................................... 310/90

FOREIGN PATENT DOCUMENTS

| 0327338 | 8/1989 | (EP) . |
| 0632566A1 | 1/1995 | (EP) . |
| 2293694 | 4/1996 | (GB) . |
| 61-052136 | 3/1986 | (JP) . |
| 61-147744 | 7/1986 | (JP) . |
| 61-147744A * | 7/1986 | (JP) . |
| WO88/06371 | 8/1988 | (WO) . |
| WO89/11176 | 11/1989 | (WO) . |

* cited by examiner

Primary Examiner—Nestor Ramirez
Assistant Examiner—Guillermo Perez
(74) Attorney, Agent, or Firm—Margaret A. Dobrowitsky

(57) ABSTRACT

An electric motor or generator (10) comprising a housing (12) having a substantially annular inner surface (24); a stator (14) having an annular outer surface (25) fixedly secured within the housing against the annular inner surface; a shaft (16) having a longitudinal axis (A), extending into the housing, and rotatable about the longitudinal axis relative to the housing and the stator; a rotor coil (18) mounted on the shaft and positioned within the stator; and a thermally conductive epoxy resin (28) impregnating the stator; wherein the annular inner surface of the housing and/or the annular outer surface of the stator has a number of longitudinally extending slots (30,31) formed therein within which the epoxy resin is also positioned. The slots improve the impregnation process by reducing impregnation time and improves the quality by reducing the risk of air pocket formation within the epoxy resin.

8 Claims, 3 Drawing Sheets

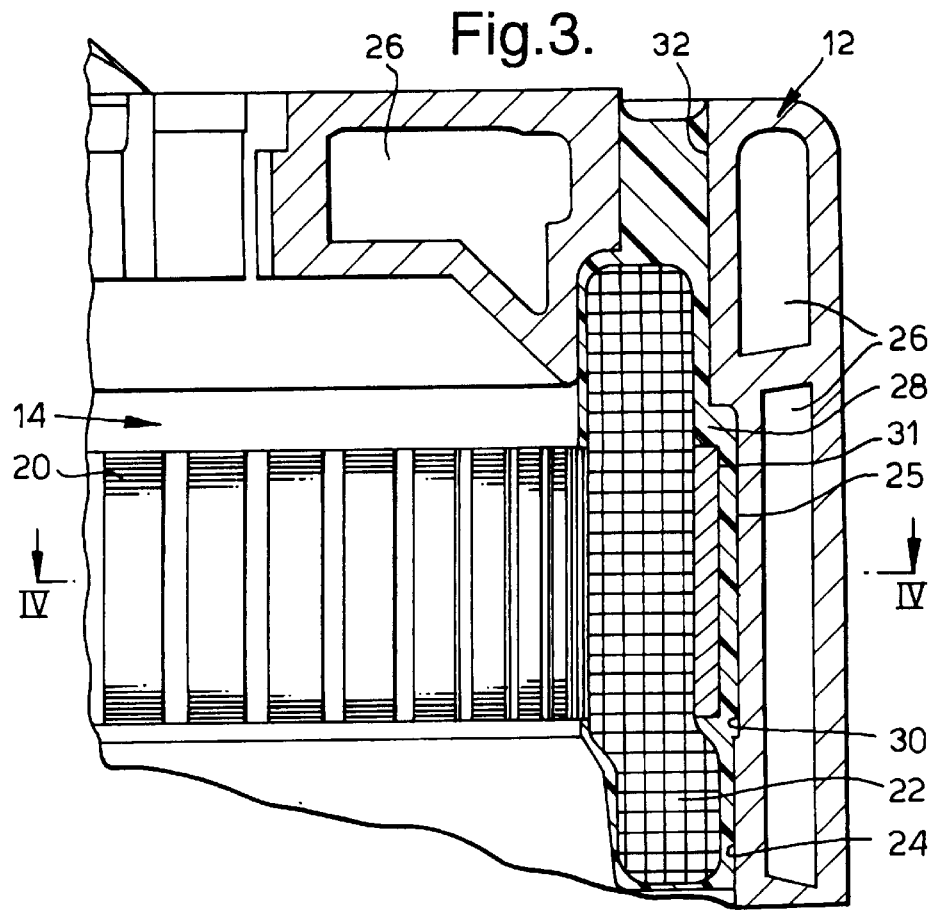
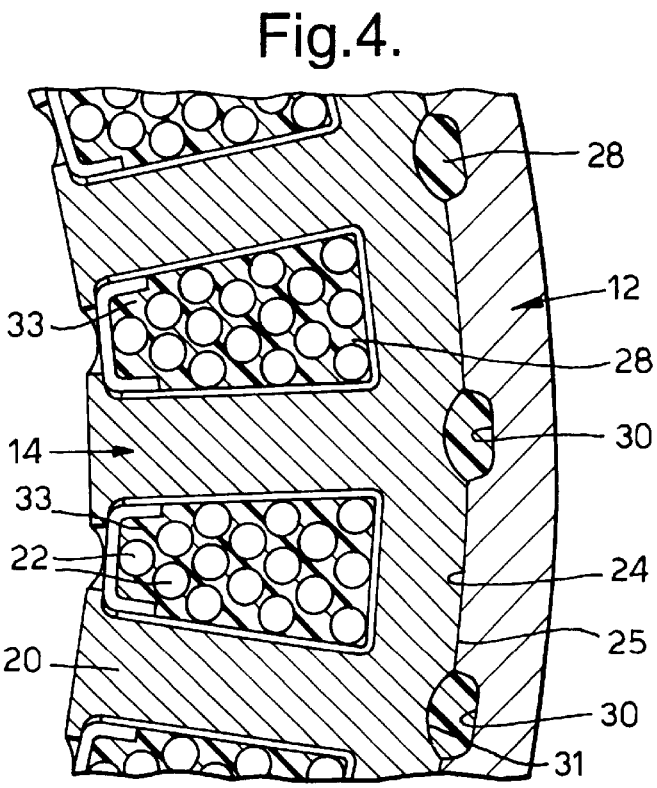

ELECTRIC MOTOR OR GENERATOR

TECHNICAL FIELD

The present invention relates to an electric motor or generator, such as an alternator, having a stator impregnated with a thermally conductive epoxy resin.

BACKGROUND OF THE INVENTION

Electric motors or generators having a stator secured within the housing of the rotor or generator are well known. A rotor coil mounted on a shaft is positioned within the stator and is rotatable relative to the stator about the longitudinal axis of the shaft. Liquid cooling can be provided for the motor or generator by passing fluid, such as water, through passages formed in the housing order to provide cooling for the stator. In order to enhance the cooling of the stator, the stator can be impregnated with a thermally conductive epoxy resin which promotes the thermal conductivity between the stator and the cooling fluid. EP-A-0327338 describes such a known arrangement. Because of the tight fitting of the stator in the housing, it can be difficult to impregnate the stator without leaving air pockets in the epoxy resin.

SUMMARY OF THE INVENTION

An electric motor or generator in accordance with the present invention comprises a housing having a substantially annular inner surface; a stator having an annular outer surface fixedly secured within the housing against the annular inner surface; a shaft having a longitudinal axis, extending into the housing, and rotatable about the longitudinal axis relative to the housing and the stator; a rotor coil mounted on the shaft and positioned within the stator; and a thermally conductive epoxy resin impregnating the stator; wherein the housing and the annular outer surface of the stator have a number of longitudinally extending slots formed therein within which the epoxy resin is also positioned.

The slots allow easier passage of the epoxy resin around the stator during the impregnating process. This reduces the time taken to insert the epoxy resin and improves the quality by reducing the risk of air pockets being left in the (epoxy resin.

BRIEF DESCRIPTION OF THE DRAWINGS

The present invention will now be described, by way of example, with reference to the accompanying drawings, in which:

FIG. 3 is a cross-sectional view of the housing and stator of the electric motor or generator of FIG. 1; and FIG. 4 is a cross-sectional view on the line IV—IV of FIG. 3.

DESCRIPTION OF THE PREFERRED EMBODIMENT

Figure 1:
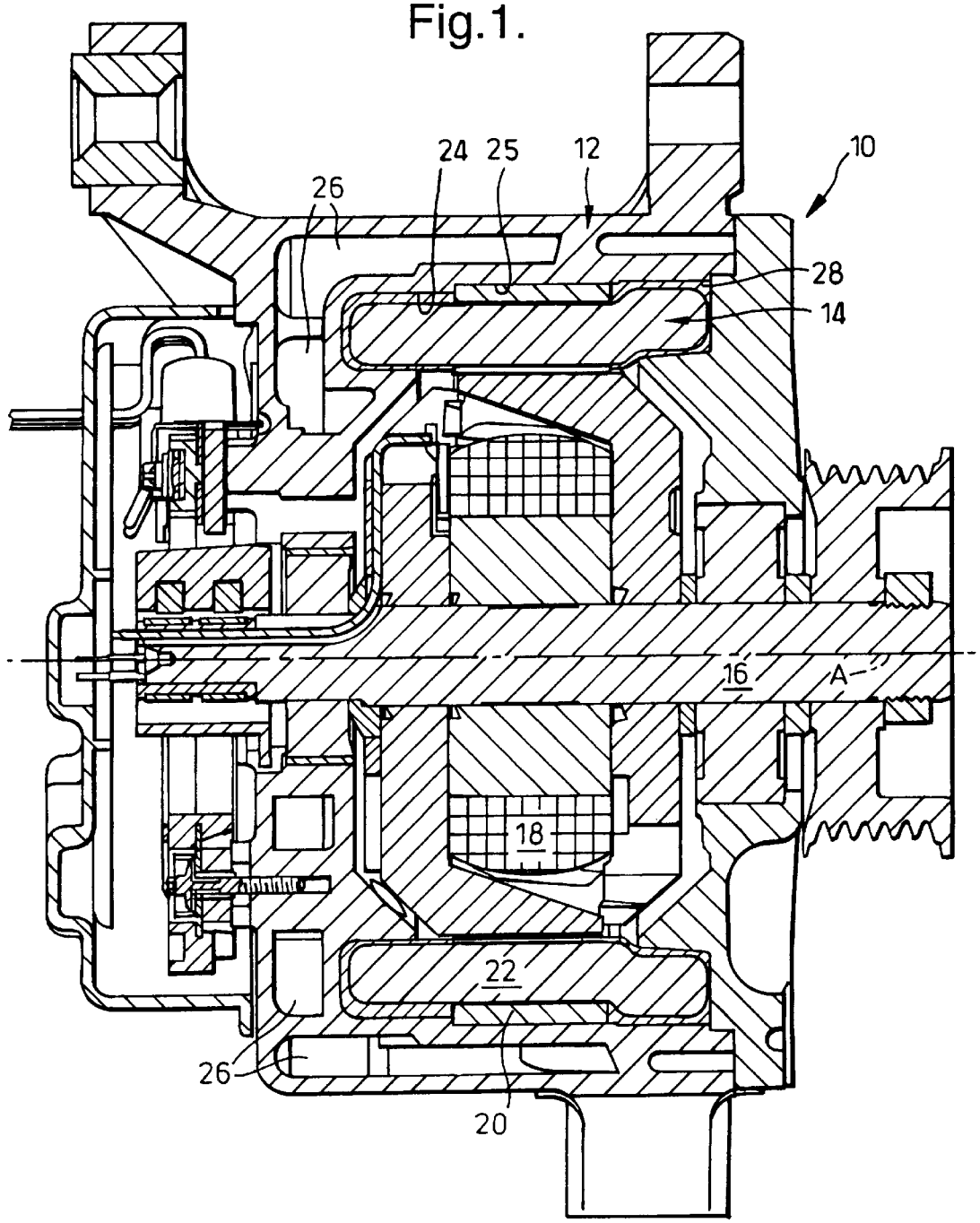
FIG. 1 is a cross-sectional view of an electric motor or generator in accordance with the present invention.
Figure 2:
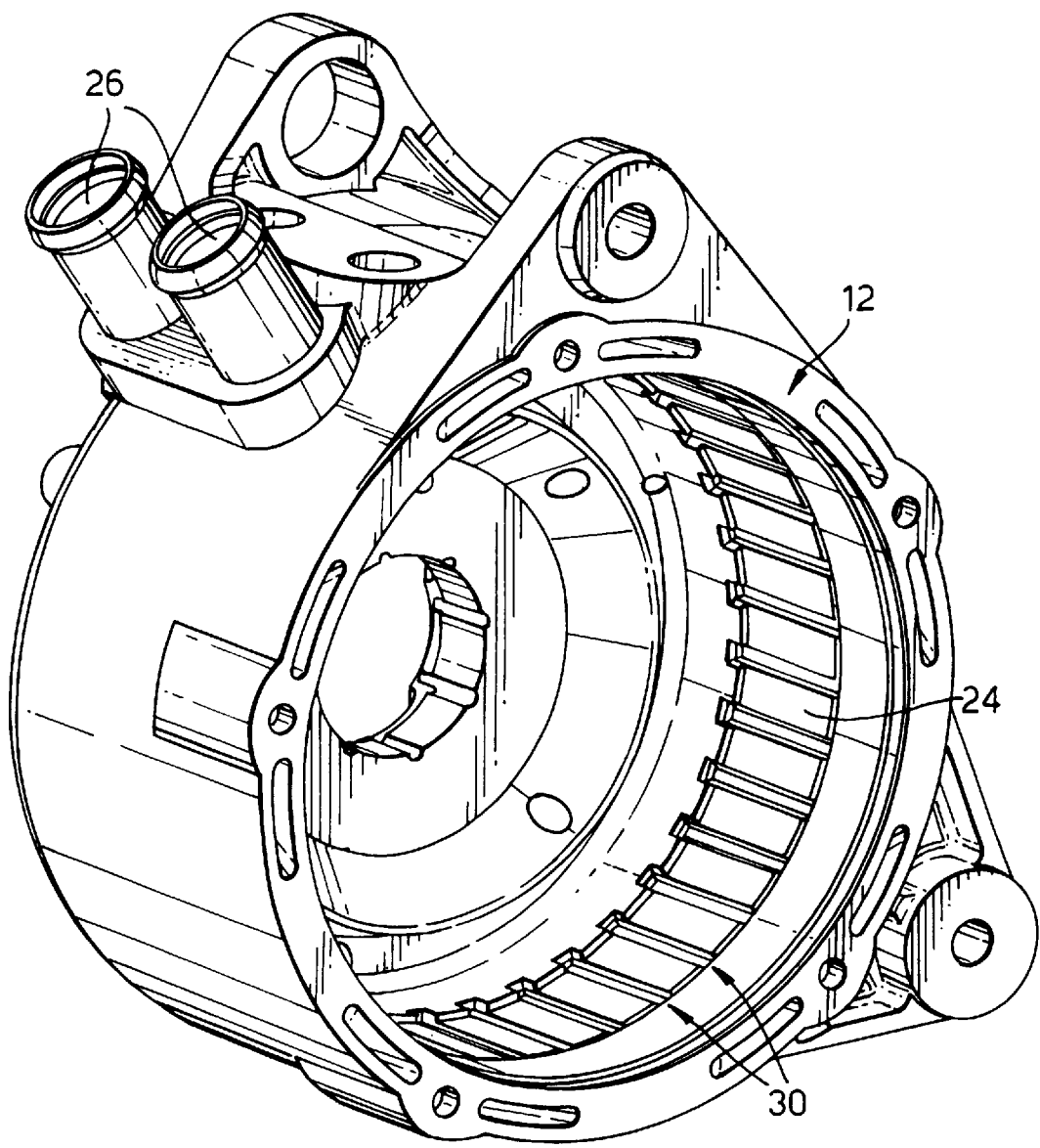
FIG. 2 is a perspective view of the housing of the electric motor or generator of FIG. 1.

Referring to the drawings, the embodiment of electric motor or generator in accordance with the present invention is an alternator 10. The alternator 10 comprises a housing 12, a stator 14, a shaft 16, and a rotor coil 18. The stator 14 is substantially annular and comprises a number of stator laminations 20 with a coil 22 wound around and through the laminations. The housing 12 has annular inner surface 24 against which the annular outer surface 25 of the stator 14 makes a tight fit. Passages 26 are formed in the housing 12 for the passage of a cooling fluid through the housing. The stator 14 is impregnates with a thermally conductive epoxy resin 28 after the stator has been positioned in the housing 12, with the epoxy resin substantially filling every gap between the stator coil 22, the laminations 20, and the housing 12. The epoxy resin 28 enhances the thermal conductivity between the stator 14 and the cooling fluid in the passages 26 in the housing 12. The rotor coil 18 is mounted on the shaft 16 and positioned inside the stator 14. The shaft 16 has a longitudinal axis A and is rotatable about its axis relative to the housing 12 and the stator 14. The alternator 10 as thus far described is well known and other features of the alternator which are well known to those skilled in the art will not be described in further detail.

In order to provide quicker insertion of the epoxy resin 28 during the embedding process, and in order to reduce the likelihood of air pockets being formed in the epoxy resin, a number of longitudinally extending slots 30 are formed in the annular inner surface 24 of the housing 12, and a corresponding number of longitudinally extending slots 31 are formed in the annular outer surface 25 of the stator 14. During assembly of the alternator 10, the stator 14 is pushed into the housing 12 and the annular outer surface 25 makes a tight sliding fit against the annular inner surface 24 of the housing, with the slots 30,31 therein being substantially aligned. Epoxy resin 28 is then introduced around the stator 14 by any suitable process, for example, by injection or gravity feeding, for example, through one or more radially extending apertures 32 in the housing 12, and allowed to harden. As an alternative, the aperture(s) in the housing 12 may extend radially. At least one additional aperture (not shown) may also be provided in the housing 12 to allow the escape of air during the filling process. The slots 30 in the annular inner surface 44 of the housing 12 and the slots 31 in the annular outer surface 25 of the stator 14 allow the epoxy resin 28 to more easily flow around the coil 22 of the stator 14 and into the gaps 33 between the coil 22 and the laminations 20, when compared to a housing having no such slots. This provides for quicker insertion of the epoxy resin 28, reduced risk of air pocket formation, and reduced risk of separation of the components (such as the filler) of the epoxy resin. As a further advantage, the keying of the stator 14 to the housing 12 by way of the epoxy resin 28 in the slots 30 reduces the risk of unintended stator rotation relative to the housing.

In an alternative to the above described arrangement, the slots 30 in the annular inner surface 24 of the housing 12, or the slots 31 in the annular outer surface 25 of the stator 14, may be omitted.

The housing 12 is preferably cast in one piece using the lost foam or sand cast process.

What is claimed is:

1. An electric machine (10) comprising a housing (12) having a substantially annular inner surface (24); a stator (14) having an annular outer surface (25) fixedly secured within the housing against the annular inner surface; a shaft (16) having a longitudinal axis (A), extending into the housing, and rotatable about the longitudinal axis relative to the housing and the stator; a rotor coil (18) mounted on the shaft and positioned within the stator; said stator having a plurality of teeth, said plurality of teeth defining a plurality of gaps (33) for retaining a stator coil (22); and a thermally conductive epoxy resin (28) impregnating the stator; the improvement comprising the annular inner surface (24) of the housing (12) having a first plurality of longitudinally extending slots (30) formed therein and the annular outer surface (25) of the stator (14) having a second plurality of longitudinally extending slots (31) formed therein, the epoxy resin (28) being positioned within said first plurality of longitudinally extending slots and said second plurality of longitudinally extending slots, said second plurality of longitudinally extending slots (31) being distinct from said gaps (33), and each of said second plurality of slots being radially aligned with one of said plurality of teeth.

2. An electric machine as claimed in claim 1, in which the slots (30,31) are formed in both the annular inner surface (24) of the housing (12) and in the annular outer surface (25) of the stator (14), wherein the number of slots in the inner surface and in the outer surface is the same, and wherein the slots are substantially aligned.

3. An electric machine as claimed in claim 1, wherein the housing (12) hag at least one aperture (32) formed therein for the introduction of the epoxy resin (28), and at least one opening for the evacuation of air.

4. An electric machine as claimed in claim 1, wherein the housing (12) has fluid cooling passages (26) formed therein.

5. An electric machine as claimed in claim 1, wherein the housing (12) has been cast in one piece using the lost foam or sand cast process.

6. An electric machine as claimed in claim 1, wherein the electric machine is an alternator (10).

7. A method for impregnating a stator (14) of an electric machine (10) comprising a housing (12) having a substantially annular inner surface (24) with a thermally conductive epoxy resin (28), said stator (14) having an annular outer surface (25), said stator further having a plurality of teeth, said plurality of teeth defining a plurality of gaps (33) for retaining a stator coil, comprising the steps of:

forming a first plurality of longitudinally extending slots (30) into said annular inner surface (24) of said housing (12).

forming a second plurality of longitudinally extending slots (31) into said annular outer surface (25) of said stator (14), such that each of said second plurality of longitudinally extending slots (30) is distinct from each of said plurality of gaps (33) and such that each of said second plurality of longitudinally extending slots (3 1) is radially aligned with one of said plurality of teeth, assembling said stator (14) into said housing (12) such that each of said first plurality of longitudinally extending slots (30) is in radial alignment with one of said second plurality of longitudinally extending slots (31); and injecting said epoxy resin (28) into said first plurality of longitudinally extending slots (30) in said annular inner surface (24) of said housing (12) and into said second plurality of longitudinally extending slots (31) in said annular outer surface (25) of said stator (14).

8. The method of claim 7 further comprising the step of allowing said epoxy resin to harden.

* * * * *